May 22, 1962  P. N. BRAUN ET AL  3,035,951
TEXTILE REPAIR MACHINE
Filed June 15, 1960  3 Sheets-Sheet 1

INVENTORS:
PHILIP N. BRAUN,
JOHN F. FILSINGER,
BY *D. Emmett Thompson*
THEIR ATTORNEY.

INVENTORS:
PHILIP N. BRAUN,
JOHN F. FILSINGER,
BY *D. Emmett Thompson*
THEIR ATTORNEY.

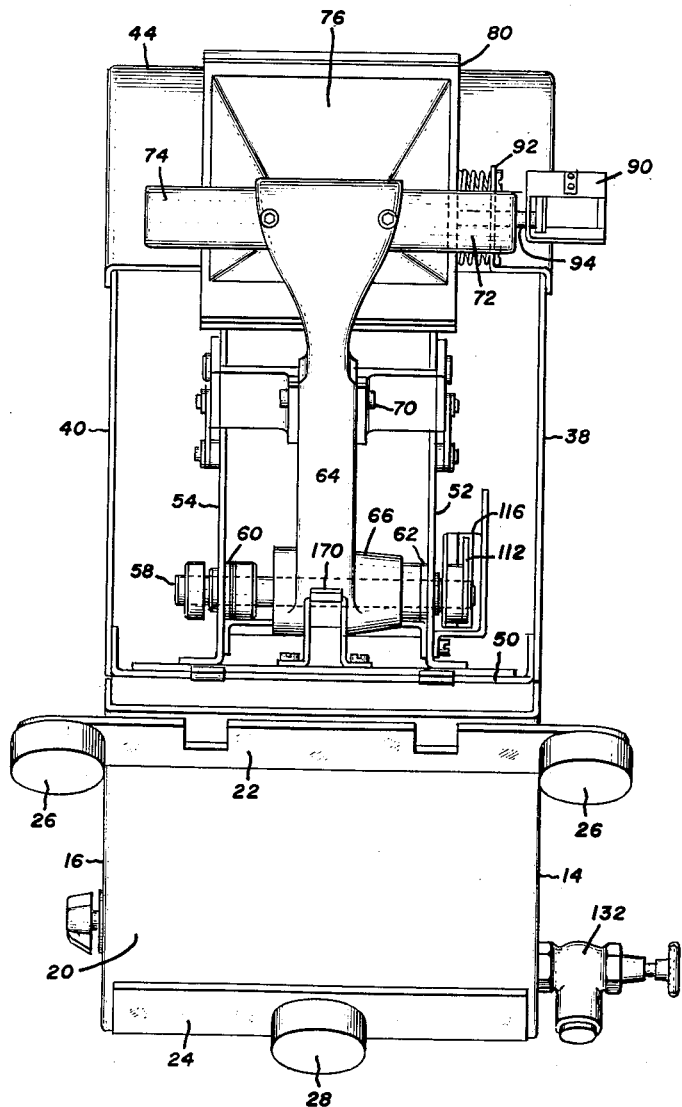

United States Patent Office 3,035,951
Patented May 22, 1962

3,035,951
TEXTILE REPAIR MACHINE
Philip N. Braun, 237 Robneau Road, Syracuse, N.Y., and John F. Filsinger, Syracuse, N.Y.; said Filsinger assignor to said Braun
Filed June 15, 1960, Ser. No. 36,421
1 Claim. (Cl. 100—93)

This invention relates to a machine for repairing textile articles by heat sealing patches thereto. During laundry operations and in actual use, articles such, for example, as bed sheets often become torn, or ripped, necessitating repair before the article can be again used.

The machine of our invention functions to heat seal a patch of thermoplastic material, or containing thermoplastic material, to the damaged textile article. A platen having a flat and preferably resilient surface is mounted upon an arm whereby the platen is moved toward a heat sealing iron. The damaged area of the article is placed upon the platen, a patch placed upon the article and the platen moved toward the heated iron. As the platen with the garment and patch thereon is moved toward the sealing iron, a power operated assist mechanism engages the platen carrying arm to effect compression between the platen and the iron under predetermined pressure for a predetermined period to effect proper heat sealing of the patch to the damaged article.

The invention has as an object a new and improved textile repair machine embodying a construction particularly economical to manufacture and which is efficient in operation and particularly convenient to use.

The invention consists in the novel features and in the combinations and constructions hereinafter set forth and claimed.

In describing this invention, reference is had to the accompanying drawings in which like characters designate corresponding parts in all the views.

In the drawings—

FIGURE 4 is a front elevational view of the machine looking in the direction of the arrow 4 on FIGURE 2.

Figure 1:
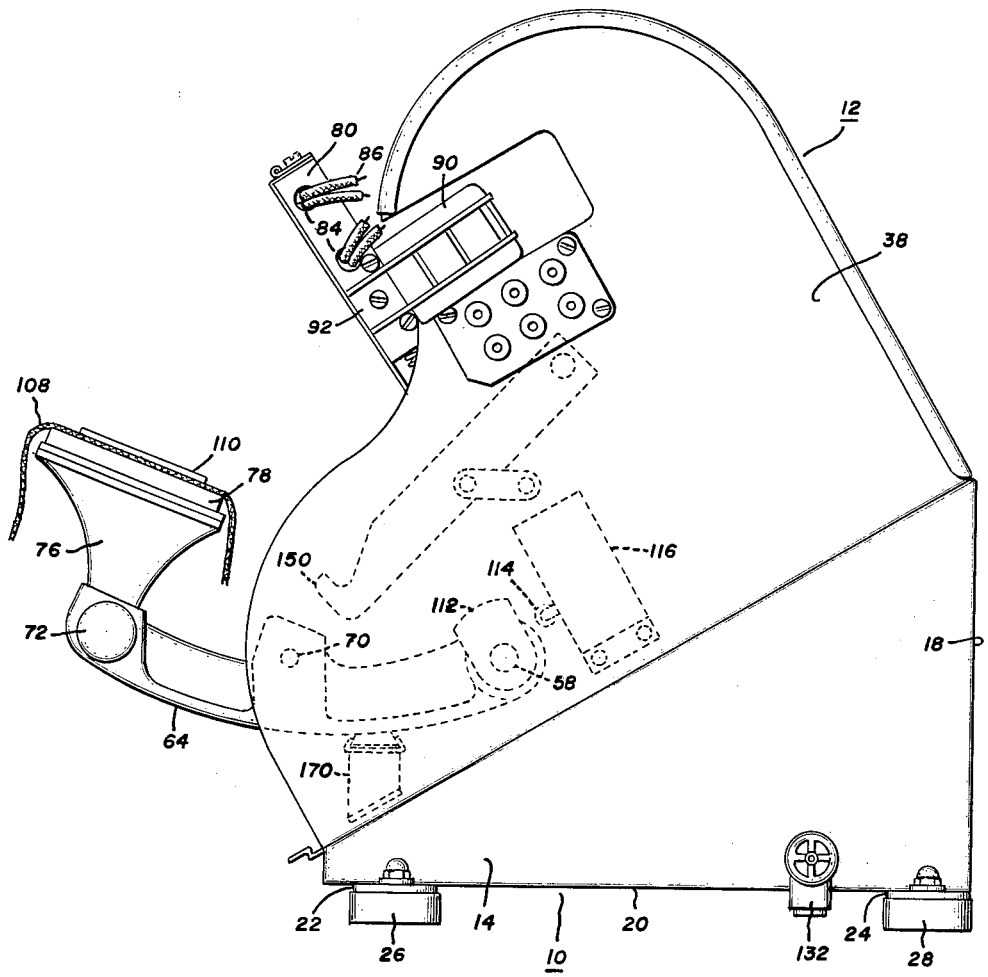
FIGURE 1 is a side elevational view of the machine comprising the preferred embodiment of the invention.

The machine consists generally of a base structure on which a frame is mounted. A heat sealing iron is mounted on the frame and is inclined forwardly and upwardly. An arm is pivotally mounted at one end in the frame and carries an article or garment supporting platen at its free end, the arm being movable about its pivot to move the platen upwardly toward the sealing iron. The arrangement is such that when the arm is in its lowermost position, the article supporting platen is substantially horizontal whereby a patch positioned on an article placed on the platen will remain in position during upward movement of the platen toward the iron. A power operated assist means is provided for coupling with the arm when the platen is in proximity to the sealing iron to further move the platen toward the iron to compress the article and patch between the platen and the sealing iron. Timer means is provided for effecting this compression for a predetermined period of time and under a predetermined pressure so that the patch is effectively sealed to the article being repaired.

In the construction shown, the base structure is in the form of a housing having a lower compartment generally indicated by the reference numeral 10, and an upper compartment indicated generally by the reference numeral 12. The lower compartment 10 is defined by a pair of side walls 14, 16, a rear wall 18, and a bottom wall 20. A pair of cross bars 22, 24 are affixed to the bottom wall 20, see FIGURE 4, and are provided with pads 26, 28. A plurality of cross members 30, 32 and 34 are fixed to the side walls 14, 16, and extend transversely of the lower compartment and serve to support a partition or separating wall 36 which inclines upwardly and rearwardly, see FIGURE 2.

The upper compartment is defined by side walls 38, 40, and a rear wall 42 which extends upwardly and curves forwardly to form a top portion 44. A frame is mounted on the bottom wall 36 in the upper compartment 12 and comprises a plate 50 and a pair of upwardly extending side plates 52, 54, affixed thereto, see FIGURE 4. A back plate 56 is fixedly secured to the rear edges of the side plates 52, 54, and extends upwardly beyond the side plates for supporting the sealing iron and the power assist actuator.

A main cross shaft 58 is journalled in a pair of bearings 60 and 62 carried by the side plates 52 and 54 to permit rotation of the shaft 58. A supporting arm 64, formed with a hub portion 66 at its lower end, is fixedly secured to the shaft 58. The arm 64 is formed intermediate its ends with a forwardly projecting portion 68 which has a pin 70 extending laterally therefrom on each side for a purpose to be hereinafter described. The upper end of the arm 64 is enlarged, as best seen in FIGURE 4, and has a pair of handles 72 and 74 affixed thereto and extending laterally outwardly from the arm 64. A platen 76 is affixed to and projects forwardly from the inner face of the upper end of the arm 64 and a deformable resilient member 78 is affixed to the face of the platen 76.

A heat sealing iron 80 is affixed to a generally U-shaped member 82 carried by the back plate 56 and the heat sealing iron 80 is provided with a plurality of apertures 84 extending from one side into the heat sealing iron 80 in which heating elements, not shown, are mounted and are connected by the leads 86 to a power supply source.

A thermostatic control member generally indicated by the reference numeral 90 is affixed to and carried by a spring mounted arm 92, see FIGURE 4, and the control element 90 is provided with a sensing element 94 which extends into the heat sealing iron 80. The aperture which receives the sensing element 94 is oversized, and the spring mounting of the plate and control 90 permits the sensing element to be free floating within the heat sealing iron 80 so as to prevent any damage to the element from the expansion and contraction of the iron 80.

The iron 80 has an area somewhat greater than the resilient material 78 carried by the platen 76 and hence extends beyond the periphery of the resilient member 78. In order to prevent the thermoplastic material from adhering to the iron, the face of the iron 80 is covered with a sheet of material such as "Teflon" 96, and the sheet 96 is carried by a clamp 98 affixed by means of screws 100 to the upper edge of the iron 80. The lower end of the cover 96 is carried by a similar clamp member 102 which is provided with a plurality of apertures through which mounting screws 104 are received and extend into the iron 80. A plurality of compression springs 106 are received between the under side of the iron 80 and the clamp 102 on the screws 104 to maintain the cover 96 taut on the iron 80.

In operation, the article 108 is placed over the resilient face 78 on the platen, and a patch 110 made up of a thermoplastic material is placed on the article over the damaged area of the article to be repaired. Thereafter, the arm 64 is grasped by the handles 72 and 74 by the operator and the platen 76 is moved toward the iron 80 to urge the patch and article into engagement with the iron 80. The heat of the iron 80 renders the patch 110 sufficiently plastic to seal the patch 110 to the article 108. The article and patch are maintained in engagement with the iron 80 for a predetermined period of time under a predetermined amount of pressure by automatic means to be next described.

During the movement of the arm 64, the main shaft 58 to which the arm is affixed is rotated. The right hand end of the shaft 58, as viewed in FIGURE 4, is provided with a cam member 112, also shown in FIGURE 2. Positioned in the path of movement of the cam member 112 is an actuator 114 of a microswitch 116 carried by the side wall 52 of the frame. The cam member 112 and the actuator 114 are arranged so that the microswitch is actuated by the cam member 112 just prior to the engagement of the article and patch on the platen 76 with the iron 80.

The microswitch 116 is connected by leads 118 to a control member 120 which is energized by the closure of the switch 116. The valve 124 is connected at one side through line 126 to a pressure regulator 128 having a gauge 130. The regulator is connected through the side wall 14 of the compartment 10 to a valve 132 which is, in turn, connected to a source of fluid under pressure (not shown). The opposite side of the valve 124 is connected by a line 134 to the rear of the power assist cylinder 136.

Figure 3:
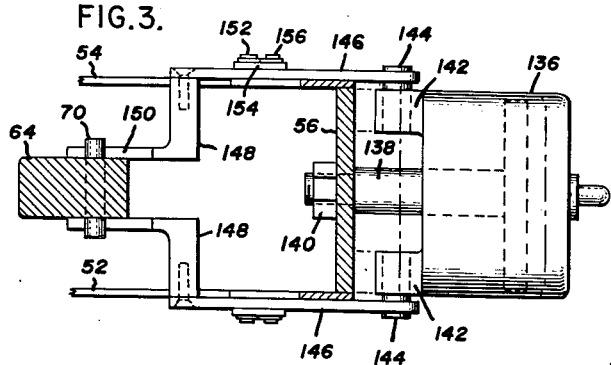
FIGURE 3 is a fragmentary view looking in the direction of the arrows of line 3—3 on FIGURE 2.

The cylinder 136, see FIGURE 3, is provided with a piston rod 138 which extends through the back wall 56 of the frame, and is fixedly secured thereto by means of the nut 140 threaded on the reduced outer end of the rod 138.

The forward end of the cylinder 136 is provided with a pair of lugs 142 which have pins 144 extending laterally outwardly therefrom. The pins 144 are received in apertured links 146. Hook members 148 are attached to the forward ends of the links 146 for engagement with the pin 70 carried by the arm 64.

Figure 2:
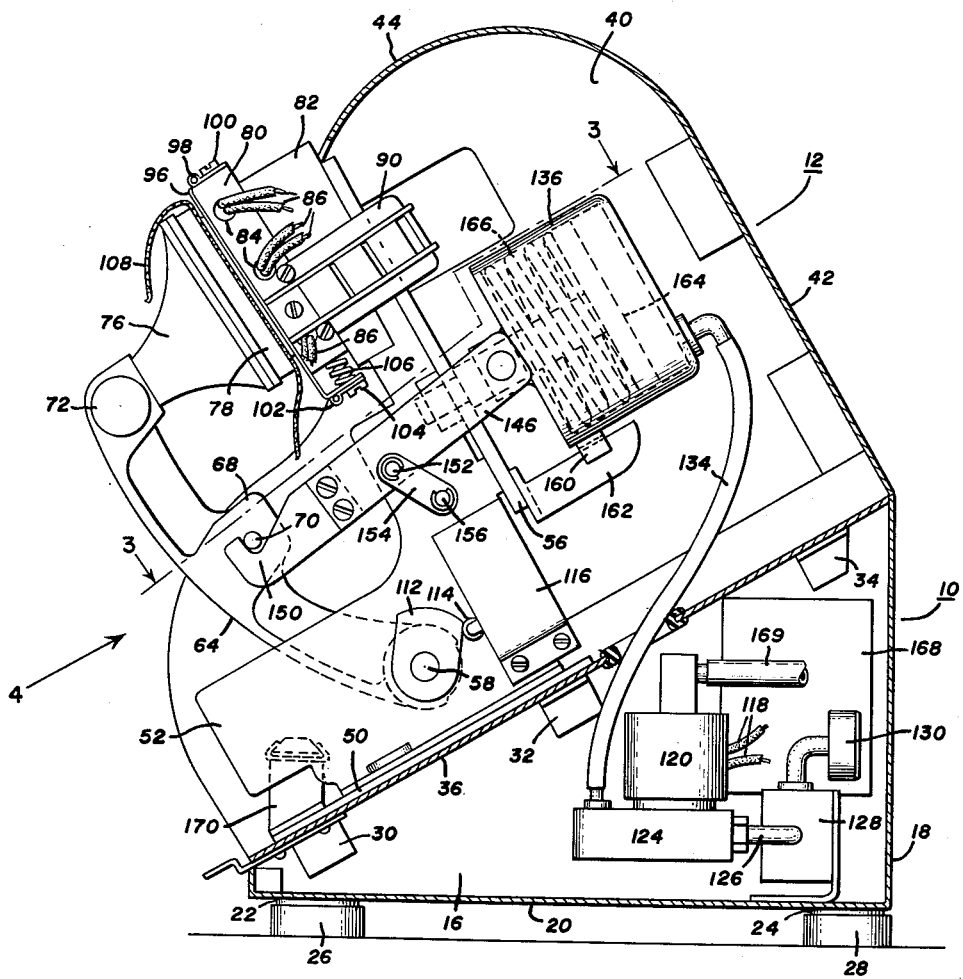
FIGURE 2 is a view, similar to FIGURE 1, with parts broken away and parts in section, showing the machine in the operating position.

As best seen in FIGURE 2, the links 146 are pivotally connected intermediate their ends, as at 152, to the links 154 which are pivotally connected at their opposite ends, as at 156, to the side wall members 52 and 54.

The bottom side of the cylinder 136 is provided with an ear 160 which has a channel formed therein to receive and ride on a guide member 162 affixed to the back plate 56 and extending rearwardly therefrom.

With this arrangement, the links 146 normally incline forwardly and downwardly to permit the pin 70 to be moved into registration with the hook portions 150 when the platen 78 is in proximity to the heating iron 80. Thereupon, the cylinder 136 is moved rearwardly effecting rearward movement of the links 146 and, because of the pivoted connection with the links 154, the forward hooked ends 150 of the links 146 is moved upwardly into engagement with the pin 70 whereby, upon further rearward movement of the cylinder, power is applied to the arm 64 to effect compression of the article and patch against the iron 80.

In operation, when the arm 64 is moved clockwise, as viewed in FIGURES 1 and 2, toward the iron 80, the cam member 112 will close the switch 116 when the platen 76 moves in close proximity to the iron 80. The closure of the switch 116 serves to admit the fluid under pressure to the rear end of the cylinder 136. The entrance of the pressure fluid acts against the piston to move the cylinder 136 rearward.

A timer 168 is provided with the compartment 10 and serves to regulate the amount of time that the valve 124 is held open which, in turn, regulates the amount of time that the cylinder 136 urges the platen 76 into engagement with the iron. Both the timer 168 and the pressure regulator 128 may be varied to vary both the time and pressure during which the article and patch are held against the heated iron in order to permit adjustment of the machine.

Upon completion of the predetermined time period, the valve 124 is reversed to exhaust through the line 134, valve 124, control member 120 and exhaust line 169. The cylinder 136, when thus exhausted, returns under the influence of the spring 166 to its initial position to permit the arm 64 to move down against the rest 170.

As seen in the drawings, the upper compartment 12 is angularly disposed on the lower compartment 10, whereby when the arm 64 is in the rest position, as shown in FIGURE 1, the platen 76 is in a substantially horizontal position. This is an important feature since it allows the article 108, which is to be mended or repaired, to be draped over the resilient face carried by the platen 76, after which the patch 110 may be placed on the article 108 and, as the result of the substantially horizontal position of the platen 76, the patch 110 will not slide or fall from the article 108, and there is no necessity for holding the patch 110 in place. When the arm 64 is moved upwardly towards the iron 80, the movement is normally very rapid so that the patch and article are urged into engagement with the iron before they have a chance to slip from the platen 76.

As will be seen, we have provided by our improved machine a simple, yet reliable, device for mending textile articles such as linens and the like.

What we claim is:

A textile repair machine adapted to heat seal patches of thermoplastic material to textile articles comprising a base, a frame mounted on said base, a heat sealing iron mounted on said frame and having a flat surface inclined forwardly and upwardly, an arm pivotally mounted in said frame, a garment supporting platen carried by said arm, said arm being movable about said pivot for movement of said platen upwardly toward said flat surface of the heating iron, said platen being positioned in substantially horizontal position when said arm is in its lowermost postion, power assist means operable when said arm is moved upwardly to position said platen in proximity to said iron to compress a garment and patch against said iron under a predetermined pressure for a predetermined time, said power assist means including means for engaging said arm at a predetermined point as it approaches said heat sealing iron, said engaging means being connected to power means for moving said arm against said iron under pressure and said power means including release means for returning said engaging means and arm to said predetermined point.

References Cited in the file of this patent
UNITED STATES PATENTS

| | | |
|---|---|---|
| 2,535,642 | Liebowitz | Dec. 26, 1950 |
| 2,663,353 | Rohdin | Dec. 22, 1953 |